(12) United States Patent
Nayak et al.

(10) Patent No.: US 10,931,628 B2
(45) Date of Patent: Feb. 23, 2021

(54) DUPLICATE ADDRESS DETECTION FOR GLOBAL IP ADDRESS OR RANGE OF LINK LOCAL IP ADDRESSES

(71) Applicant: Juniper Networks, Inc., Sunnyvale, CA (US)

(72) Inventors: Manoj Nayak, Bangalore (IN); Rafik Puttur, Dakshina Kannada (IN)

(73) Assignee: Juniper Networks, Inc., Sunnyvale, CA (US)

( * ) Notice: Subject to any disclaimer, the term of this patent is extended or adjusted under 35 U.S.C. 154(b) by 70 days.

(21) Appl. No.: 16/234,342

(22) Filed: Dec. 27, 2018

(65) Prior Publication Data

US 2020/0213269 A1 Jul. 2, 2020

(51) Int. Cl.
*G06F 15/16* (2006.01)
*H04L 29/12* (2006.01)
*G06F 9/455* (2018.01)

(52) U.S. Cl.
CPC ...... *H04L 61/2046* (2013.01); *G06F 9/45558* (2013.01); *H04L 61/2007* (2013.01);
(Continued)

(58) Field of Classification Search
CPC ............. H04L 61/2046; H04L 61/2007; H04L 61/6022; H04L 61/6059; G06F 2009/45595
See application file for complete search history.

(56) References Cited

U.S. PATENT DOCUMENTS 6,243,749 B1 6/2001 Sitaraman et al.
6,578,074 B1 6/2003 Bahlmann
(Continued)

FOREIGN PATENT DOCUMENTS

EP 3382998 A1 10/2018
JP 2004356920 A 12/2004
(Continued)

OTHER PUBLICATIONS

Dong-cheol et al., "Simultaneous multi-DAD (SDAD) in Mobile IPv6," Department of Computer Engineering, Korea University, IEEE, date of conference: Nov. 13-16, 2008, 6 pp.
(Continued)

*Primary Examiner* — Padma Mundur
(74) *Attorney, Agent, or Firm* — Shumaker & Sieffert, P.A.

(57) ABSTRACT

Techniques are described for detecting conflicts between IP addresses for assignment to virtual machines (VMs). An example network device executes a plurality of VMs and is configured to determine at least one IP address for assignment to at least one of the VMs, determine an IP address to request for the at least one VM, generate a message according to Duplicate Media Access Control Address (DMAD) Protocol including data indicating that the message includes an IP address, the data further indicating the IP address, and send the message according to DMAD via the network interface to one or more network devices to determine whether the IP address is in use by the one or more network devices. The message may specify one global IP address. Alternatively, the message may specify a range of link-local IP addresses generated from a MAC address of a network interface of the network device.

20 Claims, 6 Drawing Sheets

(52) U.S. Cl.
CPC ...... *H04L 61/6022* (2013.01); *H04L 61/6059* (2013.01); *G06F 2009/45595* (2013.01)

(56) References Cited

U.S. PATENT DOCUMENTS

| | | | |
|---|---|---|---|
| 6,957,276 | B1 | 10/2005 | Bahl |
| 6,982,953 | B1 | 1/2006 | Swales |
| 7,178,059 | B2 | 2/2007 | Greenspan et al. |
| 7,197,549 | B1 | 3/2007 | Salama et al. |
| 7,292,538 | B1 | 11/2007 | O'Rourke et al. |
| 7,321,893 | B1 | 1/2008 | Rambacher et al. |
| 7,386,629 | B2 | 6/2008 | Rover et al. |
| 7,533,165 | B2 | 5/2009 | Makino |
| 7,624,181 | B2 | 11/2009 | Townsley et al. |
| 7,648,070 | B2 | 1/2010 | Droms et al. |
| 7,792,942 | B1 | 9/2010 | Regan et al. |
| 7,991,863 | B2 | 8/2011 | Zhao |
| 8,036,237 | B2 | 10/2011 | Kolli et al. |
| 8,631,100 | B2 | 1/2014 | Gandhewar et al. |
| 8,792,502 | B2 | 7/2014 | Rajamanickam et al. |
| 10,601,766 | B2 | 3/2020 | Wackerly et al. |
| 2001/0017857 | A1 | 8/2001 | Matsukawa |
| 2003/0076805 | A1 | 4/2003 | Agrawal et al. |
| 2004/0030769 | A1 | 2/2004 | Lim et al. |
| 2004/0081122 | A1 | 4/2004 | Koodli et al. |
| 2004/0083306 | A1 | 4/2004 | Gloe |
| 2004/0148398 | A1 | 7/2004 | Park |
| 2005/0044273 | A1 | 2/2005 | Bouchat et al. |
| 2005/0066035 | A1 | 3/2005 | Williams et al. |
| 2005/0097223 | A1 | 5/2005 | Shen et al. |
| 2005/0122946 | A1 | 6/2005 | Won |
| 2005/0132209 | A1 | 6/2005 | Hug et al. |
| 2005/0235000 | A1 | 10/2005 | Keil |
| 2005/0253718 | A1 | 11/2005 | Droms et al. |
| 2005/0253722 | A1 | 11/2005 | Droms et al. |
| 2006/0020796 | A1 | 1/2006 | Aura et al. |
| 2006/0020807 | A1 | 1/2006 | Aura et al. |
| 2006/0031488 | A1 | 2/2006 | Swales |
| 2006/0047791 | A1 | 3/2006 | Bahl |
| 2006/0155563 | A1 | 7/2006 | Banerjee et al. |
| 2006/0221846 | A1 | 10/2006 | Dyck et al. |
| 2006/0239266 | A1 | 10/2006 | Babbar et al. |
| 2007/0002833 | A1 | 1/2007 | Bajic |
| 2007/0073882 | A1 | 3/2007 | Brown et al. |
| 2007/0180499 | A1 | 8/2007 | Van Bemmel |
| 2007/0203999 | A1 | 8/2007 | Townsley et al. |
| 2007/0214352 | A1 | 9/2007 | Convery et al. |
| 2008/0046597 | A1 | 2/2008 | Stademann et al. |
| 2008/0065747 | A1 | 3/2008 | Kubota |
| 2008/0159222 | A1 | 7/2008 | Akram et al. |
| 2009/0154406 | A1 | 6/2009 | Kim et al. |
| 2009/0257425 | A1 | 10/2009 | Sastry et al. |
| 2010/0042707 | A1 | 2/2010 | Zhao |
| 2010/0042714 | A1 | 2/2010 | Choi et al. |
| 2010/0191813 | A1 | 7/2010 | Gandhewar et al. |
| 2010/0191839 | A1 | 7/2010 | Gandhewar et al. |
| 2010/0214959 | A1 | 8/2010 | Kuehnel et al. |
| 2010/0218247 | A1 | 8/2010 | Nice et al. |
| 2010/0274924 | A1 | 10/2010 | Allan et al. |
| 2011/0004673 | A1 | 1/2011 | Kitamura |
| 2012/0023207 | A1 | 1/2012 | Gandhewar et al. |
| 2014/0044134 | A1 | 2/2014 | Rajamanickam et al. |
| 2015/0163192 | A1 | 6/2015 | Jain et al. |
| 2015/0295884 | A1 | 10/2015 | Zhao et al. |
| 2016/0112367 | A1 | 4/2016 | Thubert et al. |
| 2016/0308825 | A1* | 10/2016 | Jain .................. H04L 61/2046 |
| 2018/0063072 | A1 | 3/2018 | Wackerly et al. |
| 2020/0045011 | A1 | 2/2020 | Nayak et al. |
| 2020/0099654 | A1 | 3/2020 | Jose et al. |

FOREIGN PATENT DOCUMENTS

| | | |
|---|---|---|
| WO | 03/055180 A1 | 7/2003 |
| WO | 03/081875 A1 | 10/2003 |
| WO | 2005050897 A2 | 6/2005 |

OTHER PUBLICATIONS

Extended Search Report from counterpart European Application No. 19182030.7, dated Dec. 5, 2019, 10 pp.
"VM Server for SPARC 3.5 Administration Guide," Oracle, Nov. 2017.
"Arp-scan User Guide," NTA-Wiki, Jun. 28, 2018, 13 pp.
Radek Hladik, "linux—Fast ARP scan in address-less DAD (Duplicate Address Discovery) mode—Server Fault," Jul. 27, 2016, 2 pp.
Thomson et al., "IPv6 Stateless Address Autoconfiguration," Network Working Group, Request for Comments: 4862, Sep. 2007, 31 pp.
Narten et al., "Neighbor Discovery for IP Version 6 (IPv6)," Network Working Group, Request for Comments: 2461, Dec. 1998, 93 pp.
Moore, "Optimistic Duplicate Address Detection (DAD) for IPv6," Network Working Group, Request for Comments: 4429, Apr. 2006, 17 pp.
Narten et al., "Neighbor Discovery for IP version 6 (IPv6)," Network Working Group, Request for Comments: 4861, Sep. 2007, 97 pp.
Hinden et al., "IP Version 6 Addressing Architecture," Network Working Group, Request for Comments: 4291, Feb. 2006, 26 pp.
Cheshire, "IPv4 Address Conflict Detection," Network Working Group, Request for Comments: 5227, Jul. 2008, 22 pp.
Jose et al., "Automatic Recovery From Duplicate Network Addresses," U.S. Appl. No. 16/138,767, filed Sep. 21, 2018.
Nayak et al., "Detecting Hardware Address Conflicts in Computer Networks," U.S. Appl. No. 16/050,983, filed Jul. 31, 2018.
Nayak et al., "Faster Duplicate Address Detection for Ranges of Link Local Addresses," U.S. Appl. No. 16/234,320, filed Dec. 27, 2018.
"Address Resolution Protocol," Wikipedia, retrieved Mar. 25, 2017, 7 pp.
"Change (Spoof) MAC Address on Windows 2000. XP, 2003, VISTA, 2008, Windows 7," KLC Consulting, Inc., accessed on Oct. 18, 2010, from http://www.klcconsulting.net/Change_MAC_w2k.htm, 8 pp.
"Change Mac Address," File Buzz, accessed on Oct. 18, 2010, from http://www.filebuzz.com/files/Change_Mac_Address/1.html, 4 pp.
"Gentle MAC Pro v4.0," File Buzz, accessed on Oct. 18, 2010, from http://www.filebuzz.com/fileinfo/32000/Gentle_MAC_Pro.html, 2 pp.
"IEEE Standard for Local and Metropolitan Area Networks, IEEE Std 802.1ag™—2007—Virtual Bridged Local Area Networks—Amendment 5: Connectivity Fault Management," IEEE Computer Society, LAN/MAN Standards Committee, Dec. 7, 2007, 260 pp.
"MacIP Change v1.0," File Buzz, accessed on Oct. 18, 2010, from http://www.filebuzz.com/fileinfo/36702/MacIP_Change.html, 2 pp.
"Subscriber Access Configuration Guide—Release 9.4," JUNOS® Software, Juniper Networks, Inc., Jan. 15, 2009, 38 pp.
Alexander, "DHCP Options and BOOTP Vendor Extensions," RFC 2132, Network Working Group, IETF Standard, Internet Engineering Task Force, Mar. 1997, 35 pp.
"IANA Considerations and IETF Protocol Usage," RFC 5342, IEEE, Network Working Group, Sep. 2008, 22 pp.
Droms et al., "Dynamic Heat Configuration Protocol for IPv6 (DHCPv6)," RFC 3315, Network Working Group, IETF Standard, Internet Engineering Task Force, Jul. 2003, 17 pp.
Droms, "Dynamic Host Configuration Protocol," RFC 2131, Network Working Group, IETF Standard, Internet Engineering Task Force, Mar. 1997, 46 pp.
Droms, R. and R. Cole,"An Inter-server Protocol for DHCP; draft-ieff-dhc-interserver-01.txt" Network Working Group, Internet Draft, Mar. 1997, p. 1-31.
Habets, "Arping," thomas@habets.pp.se, Jun. 21st, 2003, 3 pp.
Habets, "Playing ARP—DRAFT,I repeat: It's a draft," thomas@habets.pp.se, Mar. 30, 2007, 7 pp.
Hinden et al,, "IP Version 6 Addressing Architecture," RFC 2373, IEEE, Network Working Group, Jul. 1998, 24 pp.
Thomas et al., "Detecting Hardware Address Conflicts in Computer Networks," U.S. Appl. No. 15/472,832, filed Mar. 29, 2017.
McAuley et al. "Experience with Autoconfiguring a Network with IP Addresses", Proceedings: Communications for Network-Centric

(56) References Cited

OTHER PUBLICATIONS

Operations: Creating the Information Force, Oct. 28-30, 2001, Mclean, VA, Telcordia Technologies, Inc., 2001, p. 272-276.
Patrick, "DHCP Relay Agent Information Option," RFC 3046, Network Working Group, IETF Standard, Internet Engineering Task Force, Jan. 2001, 15 pp.
Office Action from U.S. Appl. No. 16/234,320, dated Apr. 29, 2020, 8 pp.
Response to the Office Action dated Apr. 29, 2020, from U.S. Appl. No. 16/234,320, filed Month Jul. 29, 2020, 11 pp.
Final Office Action from U.S. Appl. No. 16/234,320 dated Oct. 15, 2020, 10 pages.
Response to Final Office Action dated Oct. 15, 2020, from U.S. Appl. No. 16/234,320 filed Dec. 10, 2020, 12 pages.
Response to Extended Search Report dated Dec. 5, 2019 from counterpart European Application No. 19182030.7, filed Jan. 4, 2021, 9 pages.

* cited by examiner

```
                    1 1 1 1 1 1 1 1 1 1 2 2
0 1 2 3 4 5 6 7 8 9 0 1 2 3 4 5 6 7 8 9 0 1
```

| HARDWARE TYPE FIELD 72 |||
|---|---|---|
| PROTOCOL TYPE FIELD 74 |||
| HARDWARE ADDRESS LENGTH FIELD 76 || PROTOCOL ADDRESS LENGTH FIELD 78 |
| OPERATION CODE FIELD 80 |||
| SENDER HARDWARE ADDRESS FIELD 82 |||
| DEVICE IDENTIFIER FIELD 84 |||
| RANGE FOR TARGET HARDWARE ADDRESSES FIELD 86 |||
| RANGE FOR TARGET IP ADDRESSES FIELD 88 |||
| UNUSED FIELD 90 |||
| TARGET HARDWARE ADDRESS FIELD 92 |||
| TARGET IPV6 ADDRESSES FIELD 94 |||

FIG. 3

DUPLICATE ADDRESS DETECTION FOR GLOBAL IP ADDRESS OR RANGE OF LINK LOCAL IP ADDRESSES

TECHNICAL FIELD

The techniques of this disclosure relate to computer networks and, more particularly, assignment of network addresses for use by network devices within computer networks.

BACKGROUND

A computer network is a collection of interconnected network devices that exchange data and share resources. The network devices may be implemented as physical devices, such as desktop computers, servers, and network appliances, or may be deployed as virtual devices, such as virtual machines executing on virtualization infrastructure. In some networks, such as Ethernet networks, each network interface of the virtual or physical network device is assigned a unique network address, such as an Internet protocol (IP) address. Network devices use IP addresses to determine network routes by which to send network traffic, such as packets, to network devices.

Network devices often use the Duplicate Address Detection (DAD) protocol to determine whether an Internet protocol (IP) address is unique on a particular link. That is, prior to assigning an IP address to a VM, a network device may send a neighbor solicitation message including the IP address to other network devices to determine whether any of the network devices have reserved the IP address. If one of the other network devices has the IP address reserved, that network device responds by sending a neighbor advertisement message indicating that the IP address is reserved. If the network device receives such a neighbor advertisement message, the network device selects a different IP address and send a new neighbor solicitation message to the other network devices, and repeats this process until an unreserved IP address is discovered.

SUMMARY

In general, this disclosure describes techniques for assigning Internet protocol (IP) addresses to virtual machines (VMs), in particular by detecting conflicts between selected IP addresses in computer networks more efficiently. In some examples, these techniques address duplicate address detection for global IP addresses. In other examples, these techniques address scenarios where logical interface identifiers are generated from layer two (L2) addresses, such as media access control (MAC) addresses, and where there is, for example, a one-to-one mapping between MAC addresses and interface identifiers, so that a group of MAC addresses in a range can generate a group of link local addresses in the same range. As one example, in some cases, a network device may need to assign multiple IP addresses to multiple network devices in a short time span. This disclosure recognizes that sending individual neighbor solicitation messages for each of the IP addresses may negatively impact the network, because the overhead associated with the messages and the number of messages may consume a relatively large amount of bandwidth, and also require substantial processing by network devices receiving the messages.

According to the techniques of this disclosure, a network device may advantageously be configured to send a single Duplicate Media. Access Control Address Detection (DMAD) request message specifying one or more IP addresses to be reserved. In some examples, the DMAD request message may specify a single, global IP address. In other examples, the DMAD request message may specify a range spanning a plurality of link-local IP addresses. When a range of IP addresses is specified, the data specifying requested IP addresses may specify a first (starting) IP address in the range and a number of IP addresses in the range. In other examples, the data specifying the requested IP addressees may specify the first IP address in the range and an ending IP address in the range.

In one example, a method includes determining, by a network device, to assign at least one Internet protocol (IP) address to a virtual machine (VM) executed by the network device, determining, by the network device, an IP address to request for the VM, generating, by the network device, a message according to Duplicate Media Access Control Address Detection (DMAD) Protocol including data indicating that the message includes an IP address, the data further indicating the IP address, and sending, by the network device, the message according to DMAD to one or more network devices to determine whether the IP address is in use by the one or more network devices.

In another example, a network device includes a memory configured to store instructions for one or more virtual machines (VMs); a network interface; and a processor implemented in circuitry. The processor is configured to execute the instructions for the one or more VMs, determine to assign at least one Internet protocol (IP) address to at least one VM of the one or more VMs, determine an IP address to request for the at least one VM, generate a message according to Duplicate Media Access Control Address (DMAD) Protocol including data indicating that the message includes an IP address, the data further indicating the IP address, and send the message according to DMAD via the network interface to one or more network devices to determine whether the IP address is in use by the one or more network devices.

In another example, a computer-readable storage medium has stored thereon instructions that, when executed, cause a processor of a network device to determine to assign at least one Internet protocol (IP) address to a virtual machine (VM) executed by the network device, determine an IP address to request for the VM, generate a message according to Duplicate Media Access Control Address (DMAD) Protocol including data indicating that the message includes an IP address, the data further indicating the IP address, and send the message according to DMAD to one or more network devices to determine whether the IP address is in use by the one or more network devices.

The details of one or more embodiments of the techniques are set forth in the accompanying drawings and the description below. Other features, objects, and advantages of the techniques will be apparent from the description, drawings, and claims.

BRIEF DESCRIPTION OF DRAWINGS

FIG. 3 is a conceptual diagram illustrating another example DMAD request message format, in accordance with one or more techniques of this disclosure.

DETAILED DESCRIPTION

Figure 1:
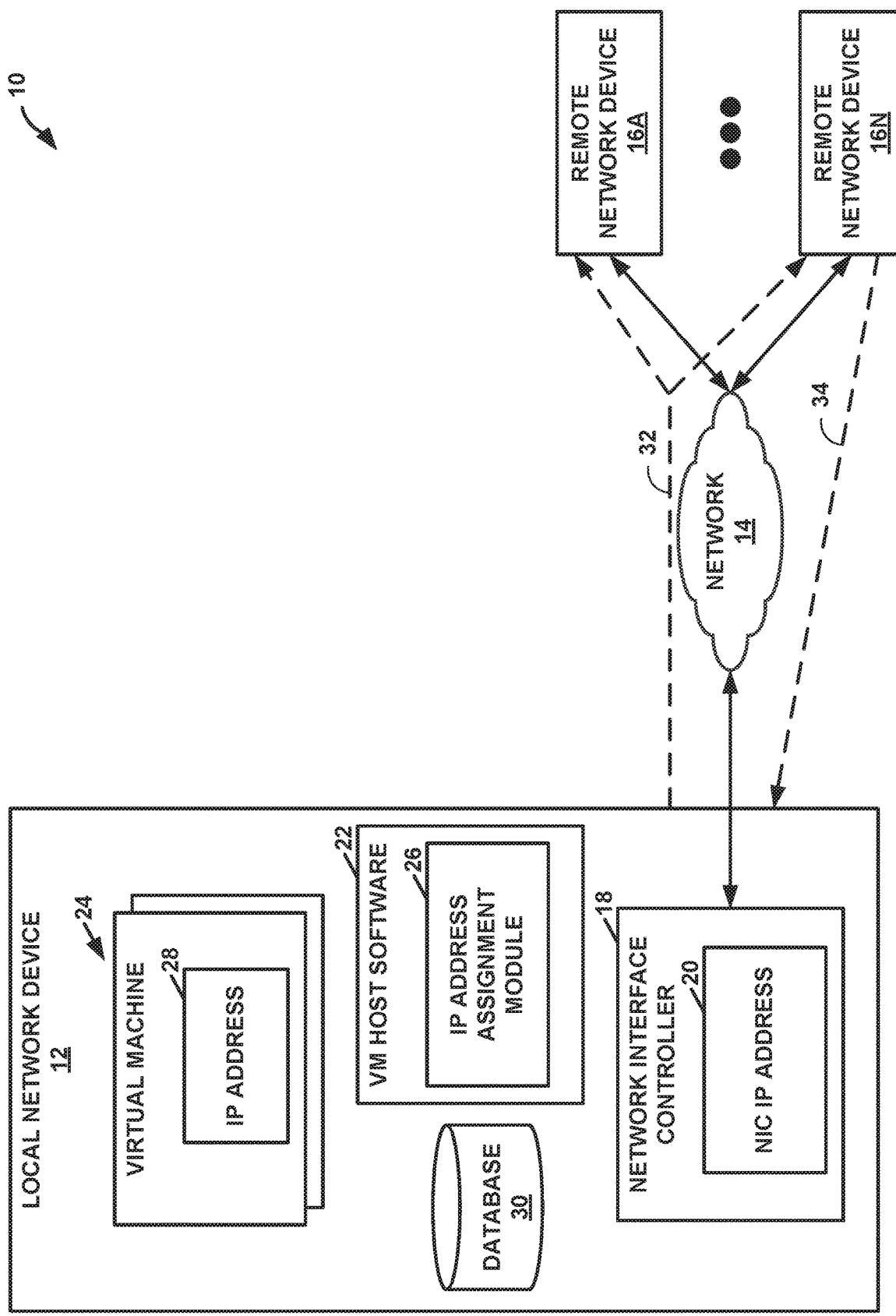
FIG. 1 is a block diagram illustrating an exemplary network system in which a local network device implements network layer address conflict detection techniques of this disclosure.

FIG. 1 is a block diagram illustrating an exemplary network system 10 in which a local network device 12 implements network layer address conflict detection techniques of this disclosure. The network layer address conflict detection techniques may be applied to detect, for example Internet protocol (IP) address conflicts. As shown in FIG. 1, network system 10 comprises local network device 12, a network 14, and remote network devices 16A-16N (collectively, "remote network devices 16"). Local network device 12 is "local" in the context of this disclosure in the sense that this disclosure describes local network device 12 as being an initiating device of the IP address conflict detection techniques of this disclosure. Likewise, remote network devices 16 are "remote" in the context of this disclosure in the sense that remote network devices 16 are remote from local network device 12. As described in more detail, local network device 12 is an example of a requesting network device, and remote network devices 16 are examples of responding network devices.

Local network device 12 may comprise various types of computing devices. For example, local network device 12 may comprise a server computer, a blade server, a personal computer, a mobile computing device (e.g., a tablet computer, smartphone), an intermediate network device (e.g., a router, gateway, intrusion detection device), or another type of network-equipped computing device. Remote network devices 16 each may comprise similar types of network-equipped computing devices.

Network 14 may comprise various devices and network links that facilitate communication among local network device 12 and remote network devices 16. For instance, network 14 may comprise one or more hubs, repeaters, and/or switches. Network 14 comprises an Ethernet network or other type of network that supports broadcast communication to all network devices connected to network 14 and relies on each device having a unique address. For ease of explanation, this disclosure primarily discusses network 14 as an Ethernet network.

As shown in the example of FIG. 1, local network device 12 comprises a network interface controller (NIC) 18. NIC 18 comprises a computer hardware component that connects local network device 12 to network 14. In some examples, MC 18 is built into a motherboard of local network device 12. NIC 18 has a NIC IP address 20. For instance, IP address 20 may be stored in a memory unit (e.g., a read only memory (ROM) unit, programmable read only memory (PROM), electrically-erasable programmable read only memory (EE-PROM)) of NIC 18. In other examples, other network layer addresses maybe substituted for NIC IP address 20. NIC IP address 20 may be assigned by a dynamic host configuration protocol (DHCP) server (not shown).

When communicating on network 14, a network device may transmit a message (hereinafter referred to as a "packet") that specifies a source IP address, a destination IP address, a source port, a destination port, and a protocol. The source IP address of the packet is the IP address of the transmitting network device, while the destination IP address of the packet is the IP address of the network device to which the packet is being sent. Sending the source IP address in the packet may allow a receiving network device to respond by sending a packet back to the initial transmitting device, as well as to determine appropriate network routes by which to forward the packet. The destination IP address of a frame identifies an intended receiver of the packet. The protocol field of a packet identifies a communication protocol of the payload of the packet.

Furthermore, as shown in the example of FIG. 1, local network device 12 may comprise virtual machine (VM) host software 22. VM host software 22 may comprise various types of software systems that host VMs 24. For example, VM host software 22 may comprise an operating system. In another example, VM host software 22 may comprise a hypervisor.

In this disclosure, VM host software 22 and an IP address assignment module (IAAM) 26 of VM host software 22 may execute on processing circuitry of local network device 12, and may configure the processing circuitry to perform the example techniques described in this disclosure. For example, memory of local network device 12 may store computer-readable instructions for VM host software 22 and IAAM 26 that the processing circuitry retrieves and executes. In some examples, the processing circuitry loads the instructions to become configured to perform the example operations described in this disclosure. In some examples, the processing circuitry may be a combination of fixed-function circuitry (e.g., having immutable operations) and programmable circuitry. For example, the processing circuitry may include one or more processors, and the processors will include programmable cores and fixed-function circuitry, as one example.

In general, each of VMs 24 is an emulation of a respective computer system. Since each of VMs 24 emulates a respective computer system, each of VMs 24 should have a respective IP address for use in communicating on network 14. Accordingly, IAAM 26 may assign a respective IP address 28 to each respective VM 24. Subsequently, when NIC 18 receives a packet specifying an IP address of a VM as the destination address, VM host software 22 accepts the frame and forwards the frame to the VM. When a VM generates a frame for transmission on network 14, the frame specifies the IP address of the VM as the source address of the frame. VM host software 22 then passes the frame to MC 18 for transmission on network 14.

Local network device 12 may generate interface identifiers using one of the following methods, in some examples. According to some RFCs, an interface identifier can be generated through some other means (e.g., at random), and there is no one-to-one mapping between interface identifier and MAC address. This random generation of interface identifier is done to handle security issues, per these RFCs. For example, laptops connected to a network can reveal a person's location if an interface identifier and a link local address are generated from a MAC address. This disclosure does not address this scenario where interface identifier is not mapped to MAC address. However, these security issues are not relevant when many thousands of VMs are located inside a lab.

EUI64 methods have been used to generate interface identifiers from IEEE 48 bit MAC identifiers as per rfc2373. Link-Local IPv6 Unicast Addresses may be generated using interface identifiers, as per RFC4291. Thus, there may be a one-to-one mapping between interface identifier and MAC address. However, there are other scenarios, where interface identifiers are generated from IEEE 48 bit MAC identifiers or some other information related to logical interface. For example, a router may configure thousands of IFLs and generate interface identifiers for those IFLs using a combination of MAC address and IFL index. As IFL indexes are in a range from 0-64k, the interface identifier and corresponding link local addresses are in the same range. This disclosure addresses the scenario where an interface identifier is mapped to a MAC address.

As previously discussed, according to the duplicate address detection (DAD) protocol, a network device typically determines whether individual IP addresses are reserved one at a time. Details regarding the use of DAD are described in, e.g., Jose et al., "AUTOMATIC RECOVERY FROM DUPLICATE NETWORK ADDRESSES," U.S. application Ser. No. 16/138,767, filed Sep. 21, 2018, the entire contents of which are hereby incorporated by reference. DAD is also described in S. Thomson et al., "IPv6 Stateless Address Autoconfiguration," Network Working Group Request for Comments (RFC) 4862, September 2007, the entire contents of which are incorporated herein by reference. However, determining whether link local addresses are duplicates each time a new VM is spun-up can be time intensive and negatively impact the amount of time the VMs need to wait before being able to transmit and receive communication. In accordance with one or more examples, a requesting network device determines whether a plurality of link local addresses is available to be reserved with a single request, thereby reducing the amount of time needed reserve link local addresses.

As noted above, local network device 12 may execute multiple (e.g., two or more) VMs 24. In some cases, local network device 12 may begin execution of multiple VMs 24 (sometimes referred to as "spinning up" the VMs) simultaneously, i.e., generally (approximately) concurrently in time so that the operations overlap, or are close to overlapping, in time, such as within a few seconds or minutes of each other. Rather than determining whether potential IP addresses for the newly executed VMs are unique one-by-one as conventionally performed using, e.g., duplicate address detection (DAD), local network device 12 may perform the techniques of this disclosure to determine whether a range of IP addresses for the multiple VMs 24 is reserved, e.g., by any of remote network devices 16. Furthermore, local network device 12 reserves the range of IP addresses for VMs 24 after having determined that the range of IP addresses are not currently reserved.

This disclosure recognizes that DAD requires two multi cast messages to pass through: a neighbor solicitation (NS) message and a neighbor advertisement (NA) message. This disclosure recognizes that there are noticeable failure rates on links that do not pass multicast reliably, such as 802.11a/b/g/n series of technologies. RFC 4862 explicitly mentions that DAD's method for detecting duplicates is not completely reliable, and it is possible that duplicate addresses will still exist (e.g., if the link was partitioned while Duplicate Address Detection was performed).

To operate ND's DAD, a node has to join a multicast address and sends a Multicast Listener Discovery (MLD) report message for the multicast address. So there is a delay before an IP address can be used. RFC4862 specifies that until the DAD procedure completes, the address remains in Tentative state. In this state, any traffic to this address other than that related to DAD-related is dropped. This introduces delay between the interface getting connected to the network and an address on this interface becoming usable.

In some examples, this disclosure describes detection of duplicate addresses using DMAD probe packets for IPv6 protocol. IPv4 stacks typically implement Address Conflict Detection (ACD) of RFC5227.

This disclosure describes various enhancements to Duplicate Media Access Control Address Detection (DMAD) protocol that may detect the presence of a duplicate global IP address and/or duplicate link local addresses being present in a network. For instance, in one or more examples, a requesting network device may, with a single request, reserve a global IP address or a plurality of link local addresses that the requesting network device determined are not duplicate addresses.

In this way, when new VMs are spun-up (e.g., instantiated), the requesting network device (e.g., local network device 12) can assign one of the new VMs a reserved global IP address and/or the new VMs link local addresses from the reserved plurality of link local addresses, without needing to determine whether the link local addresses that are to be assigned to the VMs are duplicates individually.

DMAD protocol is available at L2 layer, so Duplicate address detection (DAD) can be done through DMAD by a probe packet. ND protocol can continue to provide other functionality except DAD. However, users can choose to use DMAD protocol probe over ND's DAD for duplicate address detection. For example: Duplicate address detection for link-local address of an interface can be moved from ND's DAD to DMAD probe. ND's DAD can be used for other types of IP address used for the interface, i.e., global IP address. Since global IP address formation depends on ND's Router advertisement of prefix, ND's DAD can be used.

Earlier Detection of non-duplicate link local address is essential for IP-level connectivity of local network device 12 with neighboring nodes, such as remote network devices 16. However, users can choose to use DMAD probe for global IP address once global ip address is decided through ND's Router advertisement of prefixes that identify the subnet(s) associated with a link. This may be done to avoid Duplicate Address Detection failure when both DAD and the link partition was done at the same time.

In some examples, local network device 12 issues DMAD request message 32 (also referred to as a DMAD probe or a probe packet) to determine if a global IP address is already in use by broadcast DMAD request message 32 for the desired global IP address to remote network devices 16. Local network device 12 sets the sender hardware address field of DMAD request message 32 to the hardware address of the interface through which local network device 12 is sending DMAD request message 32 (e.g., of NIC 18). Furthermore, local network device 12 may set the sender IP address field and target hardware address field to values of zero, and the target IP address field to the global IP address being probed.

In response, remote network devices 16 return DMAD response messages (such as DMAD response message 34) to local network device 12 including IP addresses of the respective remote network devices 16 in sender IP address fields of the DMAD response messages. For example, remote network device 16N sets the value of the sender IP address field of DMAD response message 34 equal to the IP address of remote network device 16N. Remote network devices 16 also set the target hardware address field and the target IP address field to values of zero, and the sender hardware address field with the hardware address of the interface through which the DMAD response message is being sent.

If local network device 12 receives any DMAD response messages on the interface where the probe is being performed, where the packet's "sender IP address" is the address being probed for, then local network device 12 treats this address as being in use by some other host, and should indicate that the proposed address is not acceptable.

As another example, local network device 12 may reserve a range of link-local IP addresses using DMAD protocol, according to the techniques of this disclosure. Assume VM host software 22 is to instantiate three VMs 24. In some techniques, IAAM 26 would select IP addresses for each of the three VMs 24, and determine whether the three selected IP addresses are unique or are duplicates of reserved IP addresses. According to the techniques of this disclosure, local network device 12 may send a single message (e.g., DMAD request message 32) specifying a first one of the IP addresses and a range of the IP addresses and send this message to remote network devices 16. Local network device 12 may use any responses from remote network device 16 to this message to determine whether any of the IP addresses in the range is reserved. In some examples, remote network devices 16 may release a previously reserved hardware address if the previously reserved hardware address is no longer needed. Remote network devices 16 may send DMAD response messages, such as DMAD response message 34, specifying one or more reserved IP addresses, one or more reserved hardware addresses, and/or one or more released hardware addresses in response to the message from local network device 12.

Furthermore, local network device 12 may use these techniques to reserve a number of IP addresses in advance of actually needed the IP addresses for assignment to VMs 24. For example, when local network device 12 (which may be a router) configures thousands of IFLs and generates interface identifiers for those IFLs using a combination of MAC address and IFL index, local network device 12 can assign the new IFLs link local addresses from the reserved plurality of link local addresses without needing to determine whether the link local addresses that are to be assigned to the IFLs are duplicates.

Determining whether link local addresses are duplicates each time Router configures IFLs can be time intensive and negatively impact the amount of time the IFLs need to wait before being able to transmit and receive communication. In accordance with one or more examples of this disclosure, local network device 12 determines whether a plurality of link local addresses is available to be reserved with a single request, thereby reducing the amount of time needed to reserve link local addresses.

Duplicate Address Detection (DAD) protocol neighbor solicitation and neighbor advertisement messages are described in, e.g., Narten et al., "Neighbor Discover for IP version 6 (IPv6)," Network Working Group, RFC 4861, September 2007, available at tools.ietf.org/html/rfc4861. According to RFC 4861, such messages include, inter alia, a type field and a code field. The type field of a neighbor solicitation message per RFC 4861 is a value of "135," while the type field of a neighbor advertisement message per RFC 4861 is a value of "136." RFC 4861 defines neighbor solicitation and neighbor advertisement messages for a single IP address as having a code value of "0."

In accordance with the techniques of this disclosure, rather than using DAD protocol, local network device 12 may form DMAD request message 32 including data that specifies that DMAD request message 32 includes a range of IP addresses, e.g., by setting a value an operation code field to a value indicating that DMAD request message 32 specifies a range of IP addresses (namely, link-local IP addresses) being requested. Likewise, in accordance with the techniques of this disclosure, local network device 12 may determine that a DMAD response message having a value for an operation code field indicating that the DMAD response message specifies a range of reserved IP addresses specifies such ranges, such as DMAD response message 34, in response to DMAD request message 32 including a range of IP addresses, and that DMAD response message 34 indicates one or more IP addresses that are currently reserved by one of remote network devices 16.

Network devices such as local network device 12 send DMAD request messages, such as DMAD request message 32, to remote network devices 16 to determine whether link local addresses of a target node are duplicates or not. Local network device 12 may multicast such DMAD request messages to a multicast group including remote network devices 16 when local network device 12 needs to resolve the link local addresses. Thus, before sending DMAD request message 32, local network device 12 may join the all-nodes multicast address and the solicited-node multicast address of the target address. The former may ensure that local network device 12 receives DMAD response messages from other nodes already using the address, while the latter may ensure that two nodes attempting to use the same address simultaneously should detect each other's presence.

Local network device 12 may iteratively determine IP addresses (e.g., link-local IP addresses) that are not currently reserved by any of remote IP addresses 16 by using such DMAD request and DMAD response messages. For example, local network device 12 may, in response to an indication of a reserved IP address, generate a new DMAD request message starting from a new IP address that is not currently reserved for the full range as previously requested. Alternatively, local network device 12 may determine a portion of the previously requested range of IP addresses that is not reserved, and submit a new DMAD request message for a smaller range of IP addresses that were reserved.

In a first step, IAAM 26 generates a request message specifying MC IP address 20. IAAM 26 also includes a target IP address and a range of target IP addresses. The target IP address may be a IP address that IAAM 26 plans to reserve for assigning to one of VMs 24, and the range of IP addresses may be N number of consecutive IP addresses, where N is a number greater than or equal to 1. The target IP address may be the starting IP address of the range of IP addresses. As one example, the target IP address is 0, and the range is 64, meaning that IAAM 26 plans to reserve IP addresses 0 to 63.

As another example, IAAM 26 specifies the starting and ending IP addresses (e.g., IP address 10 to 19). This example is another way in which IAAM 26 specifies a range of IP addresses starting from a target IP address. For instance, in this example, the target IP address is 10 and the range is 10. There may be other ways in which to specify a range of IP addresses staring from a target IP address, and the example techniques are not limited to the specific examples provided above.

There may be various ways in which IAAM 26 determines the target IP address and the range of IP addresses.

Hardware address are generated using a random number generator for the last two bytes, and the first six bytes are based on manufacturer of NIC 20 or based on pre-configuration of VM host software 22. Since link local IP address is directly mapped to hardware address, as one example, IAAM 26 determines the link local IP address from the hardware address. IAAM 26 may be pre-configured with a value of N that defines the consecutive IP addresses IAAM 26 should reserve (e.g., N is pre-configured as 64 or 256).

For instance, physical configuration of local network device 12 allows creation of a certain number of VMs 24 with specified number of Virtual network interface controller for each VM 24. These configurations are based on the number of physical Network interface controllers 18 and capacity of each physical network interface controller 18 in terms of bandwidth.

A Network Administrator of local network device 12 may determine how many VMs 24 need to be created with certain number of virtual network interface controller for each VM 24 to achieve successful operation of VMs 24 for a predefined load.

For example, local network device 12 has two physical network interface controllers 18 and each physical Network interface controller 18 capacity is 8 Gbs (Giba-bits per second). So total network capacity available with local network device 12 is 116 Gbs. If each of the VMs 24 is expected to own 2 Gbs network capacity to execute a predefined operation then 8 VMs 24 can be created out of a single local network device 12. Each of these 8 VMs 24 can have one Virtual network interface controller. Therefore, total number of virtual interface controller is 8. In this example, suppose number of virtual network interface controller decided for a local network device 12 is X. Then X number of IP addresses need to be reserved by IAAM 26. However actual VMs 24 in operation at certain point of time may be less than the total number of VMs 24 created on local network device 12. These VMs 24 use less number of Virtual network interface controller, which is less than X.

IAAM 26 then instructs NIC 18 to send, via network 14, a packet comprising the request message and having a destination address field specifying broadcast mac address. Thus, each network device connected to network 14 (e.g., remote network devices 16, already configured VMs 24) may receive and accept the packet. In some examples, a source address field of the packet may specify the hardware address or mac address of NIC 18.

In response to receiving the frame, a network device determines whether a IP address or group of consecutive IP addresses of the network device matches IP addresses in the range of IP addresses. As an example, remote network device 16A may have reserved IP addresses for assigning to the VMs that execute on remote network device 16A. In this example, the IAAM of remote network device 16A may determine whether any of the IP addresses reserved for VMs that execute on remote network device 16A are within the range of IP addresses specified by IAAM 26. For instance, the IAAM of remote network device 16A may determine whether a group of consecutive IP addresses, which are part of the IP addresses reserved by remote network device 16A, are within the range of IP addresses specified by local network device 12.

In response to determining that remote network device 16A reserved a group of IP addresses within the range of addresses specified in the request message, remote network device 16A generates a response message. In one example, the response message specifies a range of IP addresses starting from a response IP address that are reserved by remote network device 16A. The range of IP addresses starting from the response IP address partially or fully overlap the range of IP addresses starting from the target IP address specified by local network device 12.

As an example, local network device 12 may specify the target IP address as IP and the range of IP addresses as 10 (e.g., local network device 12 is reserving addresses 10 to 19). Remote network device 16A may determine that remote network device 16A had previously reserved IP addresses 5 to 24. In this example, remote network device 16A determines that the IP addresses reserved by remote network hardware device 16A partially or fully (fully, in this example) overlap the IP address range of 10 to 19, requested to be reserved by local network device 12. In this example, remote network device 16A generates a response message indicating that remote network device 16A reserved IP addresses 5 to 24.

In some examples, the DMAD response message specifies one or more reserved hardware addresses and/or one or more released hardware addresses. Local network device 12 may utilize various factors to determine which ones and how many reserved hardware addresses can be released. Assume that IAAM 26 reserved X number of addresses. As one example, VM host software 22 may track a rate of how many VMs 24 are being spun-up and how many VMs 24 are being brought down, and IAAM 26 may determine the value of N based on the tracked rate. If on average, based on the tracked rate, N number of VMs 24 are executing on local network device 12, then (X-N) of hardware addresses can be released by IAAM 26.

For example, X is max number of VMs 24 designed for local network device 12, and X number of IP addresses are reserved by IAAM 26. However actual VMs 24 in operation at certain point of time is less than the total number of VMs 24 created on local network device 12. So these VMs 24 uses less number of Virtual network interface controller than X. Accordingly, IAAM 26 may release (X-N) hardware addresses.

Remote network device 16A then sends, on network 14, a packet comprising the DMAD response message. In some examples, a destination IP address of the packet specifies the Solicited-Node Multicast address. In some examples, the node that receives the DMAD request message has an interface address that matches the target address in the received DMAD request message, may send a DMAD response message back. An IP address remains in tentative address or tentative state until the IP address is verified to be non-duplicate one through DMAD request messages. On the other hand, in response to determining that none of the IP addresses reserved by remote network device 16A are within the range of the IP addresses specified by local network device 12, remote network device 16A does not generate a response message.

If IAAM 26 does not receive a response message specifying a range of IP addresses that partially or fully overlap the range of IP addresses starting with the target IP address specified by IAAM 26, IAAM 26 may determine that all IP addresses within the range of IP addresses starting with the target IP address are available (e.g., not duplicative). IAAM 26 may then reserve all IP addresses within the range of IP addresses starting with the target IP address (e.g., store information indicating the reserved IP addresses in database 30).

If IAAM 26 receives one or more response messages that together specify that all addresses specified by IAAM 26 are reserved by other network devices, IAAM 26 may select a new, different target hardware device, and perform the examples of the above procedure with the new target hardware device. For instance, assume IAAM 26 specified 64 IP addresses. It is possible that remote network device 16A had reserved 10 IP addresses that overlap the 64 IP addresses specified by IAAM 26, and remote network device 16A may have send a response message indicating the 10 IP addresses. Remote network device 16B may have reserved 54 IP addresses that overlap the 64 IP addresses specified by IAAM 26, and remote network device 16B may have send a response message indicating the 54 IP addresses. It is also possible that either one of remote network device 16A or 16B had reserved all of the 64 IP addresses specified by local network device 12. In either example, local network device 12 may determine that none of the 64 IP addresses local network device 12 specified are available. Local network device 12 may start with a new, different target IP address and repeat the above example procedures.

In some examples, IAAM 26 receives one or more response messages that specify a group of IP addresses that overlap with the range of IP addresses specified by local network device 12. For instance, remote network device 16A may send a response message indicating that 10 IP addresses overlap the 64 IP addresses specified by local network device 12, and remote network device 16B may not send any response. In this example, local network device 12 may reserve the 54 non-overlapping IP addresses (e.g., a subset of the IP addresses specified by local network device 12). IAAM 26 may determine whether additional IP addresses are needed, and if needed, repeat the above procedure starting from a new target IP address.

Although the above examples are described with respect to remote network device 16A, the other network devices on network system 10 operate similarly. For instance, remote network device 16B operates similar to remote network device 16A. Also, the techniques are described with respect to local network device 12. However, the techniques described in this disclosure may be performed by any and all of the network devices of network system 10. For instance, from perspective of remote network device 16A, remote network device 16A is a local network device, and local network device 12 is a remote network device.

Thus, in the example of FIG. 1, a network device (e.g., local network device 12) may determine a range of IP addresses starting from a first target IP address. Additionally, the network device may send a first request message on network 14, the first request message specifying the range of IP addresses starting from the target IP address. The network device may determine whether the network device has received one or more response messages from one or more other network devices (e.g., remote network devices 16A or 16B) of the plurality of network devices specifying one or more IP addresses within the range of IP addresses within a time limit. The network device may determine, based on whether the network device received the one or more response message, whether at least a subset of the IP addresses within the range of IP addresses is available, and reserve IP addresses based on the determination of whether at least the subset of IP addresses is available. The network device may execute one or more VMs 24, and assign one or more of the reserved IP addresses to each of the one or more VMs.

Furthermore, in the example of FIG. 1, a network device (e.g., local network device 12, one of remote network devices 16) may receive a request message specifying a range of IP addresses starting from a target IP address. The network device may determine whether a group of consecutive IP addresses of the network device match a subset of the range of IP addresses. In response to determining that the group of consecutive IP addresses of the network device match the subset of the range of IP addresses, the network device may send a response message specifying the group of consecutive IP addresses.

In the example of FIG. 1, local network device 12 may comprise a database 30. Database 30 may store data indicating reserved IP addresses of network devices connected to network 14, e.g., IP addresses reserved by remote network devices 16. VM host software 24 (e.g., IAAM 26) may add entries to database 30 specifying IP addresses in response to receiving response messages specifying the IP addresses, in response to successfully reserving IP addresses for VMs 24, or in response to other events.

Figure 2:
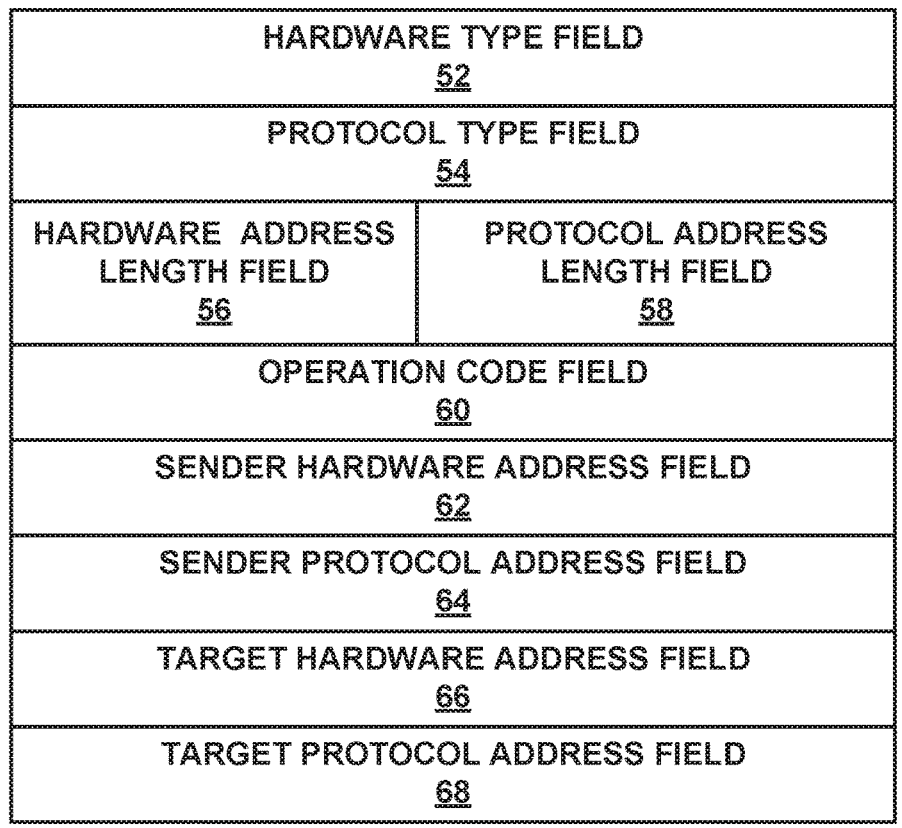
FIG. 2 is a conceptual diagram illustrating an example DMAD request/response message format, in accordance with one or more techniques of this disclosure.

FIG. 2 is a conceptual diagram illustrating an example DMAD request/response message format 50, in accordance with one or more techniques of this disclosure. DMAD request message 32 and DMAD response message 34 of FIG. 1 may conform to DMAD request/response message format 50. As shown in FIG. 2, DMAD request/response message format 50 includes hardware type field 52, protocol type field 54, hardware address length field 56, protocol address length field 58, operation code field 60, sender hardware address field 62, sender protocol address field 64, target hardware address field 66, and target protocol address field 68.

Hardware type field 52 may have a size of 2 octets and a value of "DMAD-OVER-ETHERNET."

Protocol type field 54 may have a size 2 octets and a value of 0x0800, per RFC 5342.

Hardware address length field 56 may have a size of 1 octet and a value of 6.

Protocol address length field 58 may have a size of 1 octet and a value of 16.

Operation code field 60 may have a size of 2 octets and a value of "IP-PROBE-REQUEST" for a DMAD request message or "IP-PROBE-RESPONSE" for a DMAD response message.

Sender hardware address field 62 has a size of 6 octets and specifies a hardware address (e.g., a MAC address) of a network interface of a sending device (in particular, the network interface by which the sending device sends the DMAD request/response message).

Sender protocol address field 62 has a size of 16 octets. In a DMAD request message, sender protocol address field 62 has a value of zero. In a DMAD response message, sender protocol address field 62 has a value of a global IP address of a sending device.

Target hardware address field 66 has a size of 6 octets. The value of target hardware address field 66 is set to zero for DMAD request and response messages.

Target protocol address field 68 has a size of 16 octets. In a DMAD request message, target protocol address field 68 has a value of a requested global IP address. In a DMAD response message, target protocol address field 68 has a value of the global IP address of the sending device (e.g., one of remote network devices 16).

Local network device 12 may generate DMAD request message 32 to conform to DMAD request/response message format 50. In particular, local network device 12 may set the value of sender hardware address field 62 to the value of a MAC address of a network interface of local network device 12 by which DMAD request message 32 is sent (e.g., a MAC address of NIC 18), and set the values of sender protocol address field 64 and target hardware address field 66 to zero.

Local network device 12 may then set a value of target protocol address field 68 to the value of a requested global IP address.

Remote network devices 16 may generate DMAD response messages, such as DMAD response message 34, to also conform to DMAD request/response message format 50. In particular, remote network device 16N, for example, may set sender protocol address field 64 to a value of the global IP address of remote network device 16N, and the value of target protocol address field 68 to the global IP address of remote network device 16N. Remote network device 16N may also set the value of sender hardware address field 62 to the MAC address of a network interface of remote network interface 16N by which DMAD response message 34 is sent. Remote network device 16N may also set the value of target hardware address field 66 to zero. In this manner, local network device 12 can determine whether the requested global IP address is reserved by comparing the requested global IP address to the value of sender protocol address field 64 of received DMAD response messages.

FIG. 3 is a conceptual diagram illustrating an example DMAD request message format 70, in accordance with one or more techniques of this disclosure. Local network device 12 may send a DMAD request message, such as DMAD request message 32 of FIG. 1, conforming to DMAD request message format 70 to request a range of IP addresses for reservation to remote network devices 16 of FIG. 1.

Hardware type field 72 has a size of 2 octets and a value of "DMAD-OVER-ETHERNET."

Protocol type field 74 has a size of 2 octets and a value of 0x0800, per RFC 5342.

Hardware address length field 76 has a size of 1 octets and a value of 6.

Protocol address length field 78 has a size of 1 octet and a value of 16.

Operation code field 80 has a size of 2 octets and a value of "MAC-IP-VERIFY-REQUEST."

Sender hardware address field 82 has a size of 6 octets and a value that specifies the NIC hardware address of a network device sending the DMAD request (e.g., the hardware address of NIC 18 of local network device 12 of FIG. 1).

Device identifier field 84 has a size of 4 octets. Device identifier field 84 may have a value that specifies a string, such as "RACK_01_BLADE_12".

Range for target hardware addresses field 86 has a size of 2 octets, and a value that specifies a range of hardware addresses starting from a target hardware address that needs to be verified for duplication.

Range for target IP addresses field 88 has a size of 2 octets and a value that specifies a range of link local IP addresses starting from the target IP address that need to be verified for duplication.

Unused field 90 has a size of 8 octets and a value of 0, and is reserved for future use.

Target hardware address field 92 has a size of 6 octets and a value that specifies a hardware address that needs to be verified for duplication.

Target IPv6 addresses field 94 has a size of 16 octets and a value that specifies a link local IP address that needs to be verified for duplication.

Figure 4:
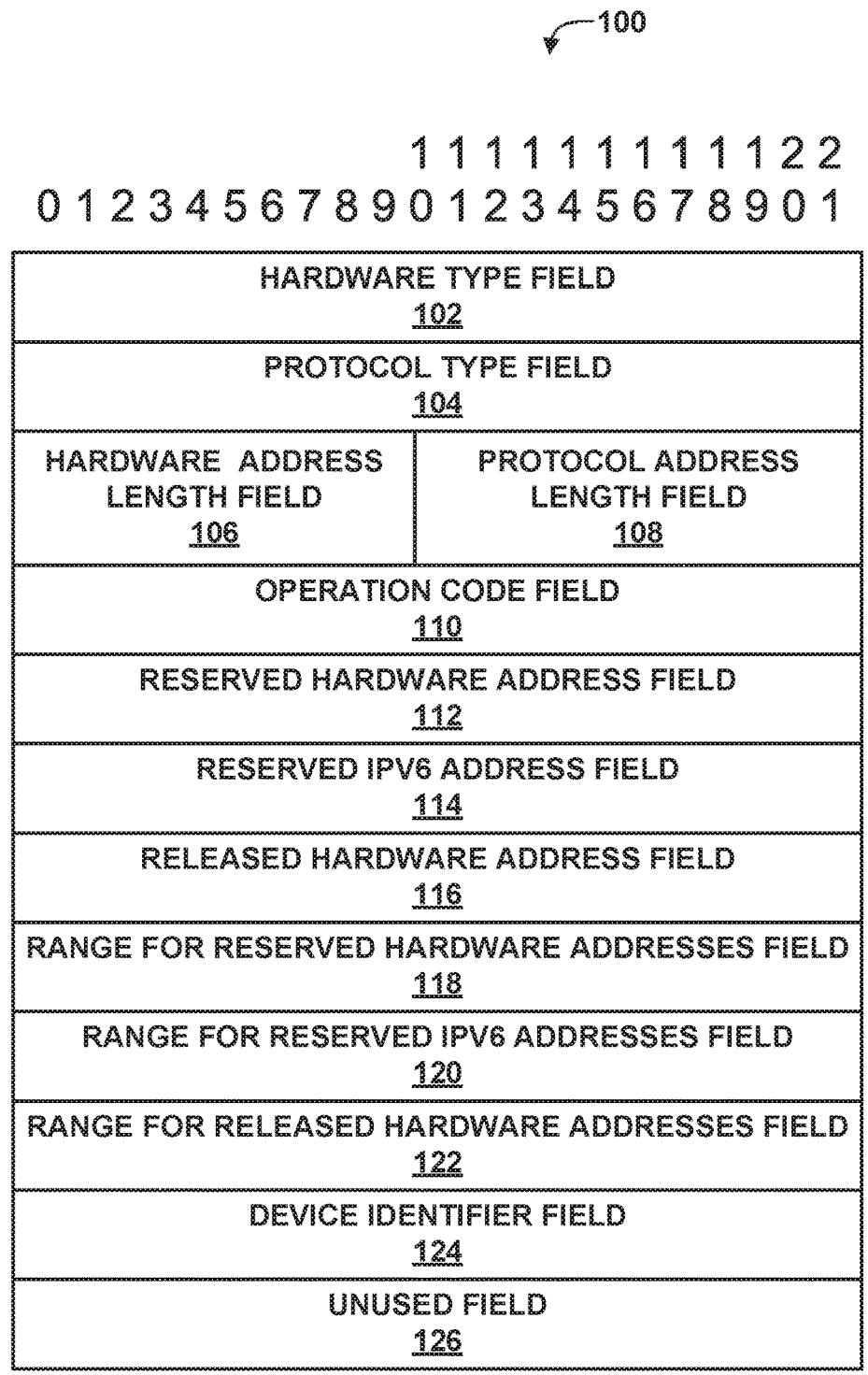
FIG. 4 is a conceptual diagram illustrating an example DMAD response message format, in accordance with one or more techniques of this disclosure.

FIG. 4 is a conceptual diagram illustrating an example DMAD response message format 100, in accordance with one or more techniques of this disclosure. One of network devices 16 may send a DMAD response message, such as DMAD response message 34 of FIG. 1, conforming to DMAD response message format 100, to indicate one or more IP addresses that are currently reserved.

Hardware type field 102 has a size of 2 octets and a value of "DMAD-OVER-ETHERNET."

Protocol type field 104 has a size of 2 octets and a value of 0x0800, per RFC 5342.

Hardware length field 106 has a size of 1 octet and a value of 6.

Protocol length field 108 has a size of 1 octet and a value of 16.

Operation code field 110 has a size of 2 octets and a value of "MAC-IP-VERIFY-RESPONSE."

Reserved hardware address field 112 has a size of 6 octets. Reserved hardware address field 112 has a value that specifies a hardware address that a host (e.g., one of remote network devices 16) has already reserved. Upon receiving a DMAD request message, such as DMAD request message 32, specifying a hardware address that is already in use, one of remote network devices 16 may send a DMAD response message to inform other hosts (e.g., other remote network devices 16 and local network device 12) that such hardware address is not available for use.

Reserved IP address field 114 has a size of 16 octets. The value of reserved IP address field 114 specifies a link local IP address that a host (e.g., one of remote network devices 16) has already reserved. Upon receiving DMAD request message 32, one of remote network devices 16 may send a DMAD response message to inform other hosts (e.g., other remote network devices 16) that such address is not available for use.

Released hardware address field 116 has a size of 6 octets. The value of released hardware address field 116 specifies a hardware address that a host (e.g., one of remote network devices 16) plans to release. Upon receiving a DMAD response message (e.g., DMAD response message 34), local network device 12 that sent DMAD request message 32 can reserve such released hardware address for future usage by itself.

Range for reserved hardware addresses field 118 has a size of 2 octets. The value of range of reserved hardware addresses 118 is a set of addresses starting from the above mentioned reserved hardware address of reserved hardware address field 112. Remote network devices 16 may use this field to inform other hosts e.g., local network device 12 and other remote network devices 16) that a set of hardware addresses are not available for use with help of a single DMAD response message.

Range for reserved IPv6 addresses field 120 has a size of 2 octets. The value of range of reserved IPv6 addresses field 120 is a set of link local addresses starting from the above mentioned reserved IP address of reserved IPv6 address field 16. One of remote network devices 16 may use this field to inform other hosts (e.g., other remote network devices 16 and local network device 12) that a set of link local IP addresses are not available for use with help of a single DMAD response message.

Range for released hardware addresses field 122 has a size of 2 octets. The value of range of released hardware addresses is a set of addresses starting from above mentioned released hardware address of released hardware address field 116. One of remote network devices 16 may use this field to inform other hosts (e.g., local network device 12 and other remote network devices 16) that a set of hardware addresses are available for use with help of a single DMAD response message.

Device identifier field 124 has a size of 4 octets. The device identifier may specify a string, such as "RACK_01_BLADE_12."

Unused field 126 has a size of 6 octets and is reserved for future use and may be set to a value of 0 and ignored by host devices receiving the DMAD response message.

In general, remote network devices 16 may receive a DMAD request message, e.g., in accordance with DMAD request message format 70 of FIG. 3, from local network device 12 specifying a range of IP addresses (such as link-local IP addresses) that local network device 12 is requesting to reserve. In accordance with the techniques of this disclosure, if one of remote network devices 16 does not have any of the IP addresses reserved, the one of remote network devices 16 may ignore the DMAD request message.

However, if one of remote network devices 16 has one or more of the IP addresses reserved, the one of remote network devices 16 constructs a DMAD response message, e.g., in accordance with DMAD response message format 100 of FIG. 4. If the one of remote network devices 16 determines that one or more of the IP addresses that were requested in the DMAD request message are currently reserved, the one of remote network devices 16 may specify a first reserved IP address in reserved IPv6 address field 114, and a range value representing a range of reserved IP addresses starting from the first reserved IP address in range for reserved IPv6 addresses field 120.

In some examples, the group of link local addresses specified as reserved by one or more of remote network devices 12 in response to a DMAD request message includes all link local addresses within the range of link local addresses of the DMAD request message. In such examples, local network device 12 determines whether there are any duplicates in a range of link local addresses starting from a different target link local address, and may repeat these example operations until local network device 12 determines link local addresses that are available.

In some examples, in response to receiving a DMAD request message specifying a range of requested link local addresses, one of remote network devices 16 may determine one or more link local addresses reserved by the one of remote network devices 16 are within the range of requested link local addresses. In such examples, the one of remote network devices 16 may transmit a DMAD response message identifying which ones of the link local addresses the one of remote network devices 16 are reserved.

Figure 5:
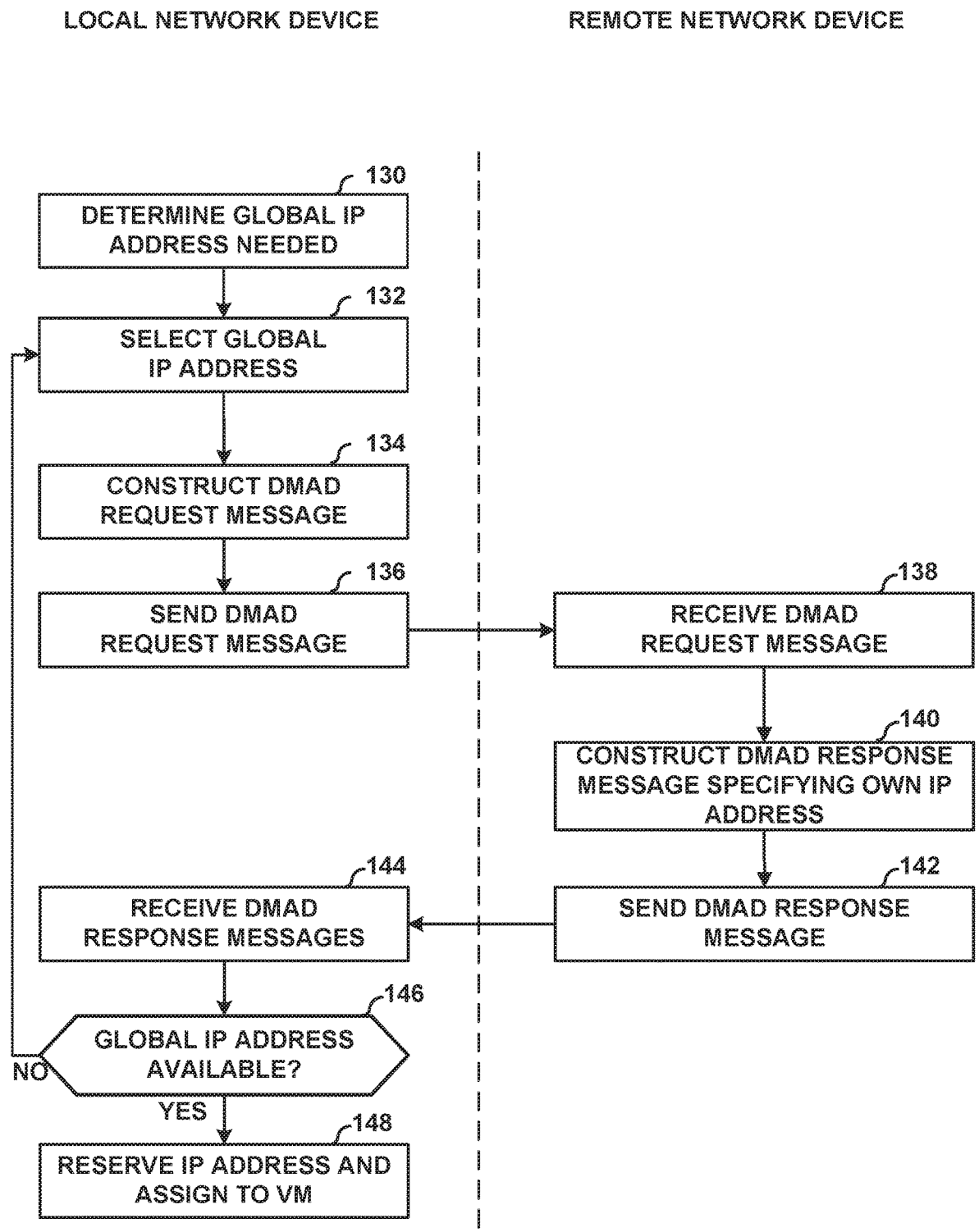
FIG. 5 is a flowchart illustrating an example method by which a network device may reserve a global IP address for a virtual machines (VM).

FIG. 5 is a flowchart illustrating an example method by which a network device (e.g., local network device 12) may reserve a global IP addresses for a virtual machines (VM), e.g., one of VMs 24, The method of FIG. 5 is explained with respect to local network device 12 and remote network device 16A of FIG. 1. However, it should be understood that other devices may perform these or similar techniques. For example, each of remote network devices 16 may perform the elements attributed to the remote network device of FIG. 5.

Initially, local network device 12 determines that a global IP addresses is needed (130). For example, local network device 12 may determine that a new VM is to be instantiated or is likely to be instantiated in the near future.

Local network device 12 may then select a global IP address to be requested (132). Local network device 12 then constructs a DMAD request message (134), e.g., in accordance with DMAD request/response message format 50 of FIG. 2. In general, local network device 12 constructs the DMAD request message to include values of 0 for sender protocol address field 64 and target hardware address field 66, and a value of the selected global IP address for target protocol address field 68. Local network device 12 then sends the DMAD request message (136), e.g., DMAD request message 32 of FIG. 1, to remote network devices 16. In particular, local network device 12 may send the DMAD request message to an IP address associated with a broadcast or multicast group to which local network device 12 and remote network devices 16 are subscribed.

Remote network devices 16, such as remote network device 16A, may then receive the DMAD request message (138). Remote network device 16A then constructs a DMAD response message, e.g., in accordance with DMAD request/response format 50 of FIG. 2, specifying its own IP address in sender protocol address field 64, and a value of the global IP address of remote network device 16A for target protocol IP address field 68 (140). Remote network device 16A then sends the DMAD response message (e.g., DMAD response message 34 of FIG. 1) to local network device 12.

Local network device 12 receives DMAD response messages from each of remote network devices 16, in this example. Local network device 12 determines whether the requested global IP address is available (146), in particular, by determining whether any of the DMAD response messages included a value of the requested global IP address in sender protocol address field 64. If one of the DMAD response messages included the requested global IP address in sender protocol address field 64, local network device 12 determines that the global IP address is not available ("NO" branch 146). In response, local network device 12 selects a new global IP address (132) and proceeds with generating and sending a new DMAD request message, as discussed above. However, once local network device 12 determines that a requested global IP address is available ("YES" branch of 146), i.e., that none of the received DMAD response messages specifies the requested global IP address in sender protocol address field 64, local network device 12 reserves the global IP address and assigns the global IP address to the VM (148).

In this manner, the method of FIG. 5 represents an example of a method including determining, by a network device, to assign at least one Internet protocol (IP) address to a virtual machine (VM) executed by the network device, determining, by the network device, an IP address to request for the VM, generating, by the network device, a message according to Duplicate Media Access Control Address Protocol (DMAD) including data indicating that the message includes an IP address, the data further indicating the IP address, and sending, by the network device, the message according to DMAD to one or more network devices to determine whether the IP address is in use by the one or more network devices.

Figure 6:
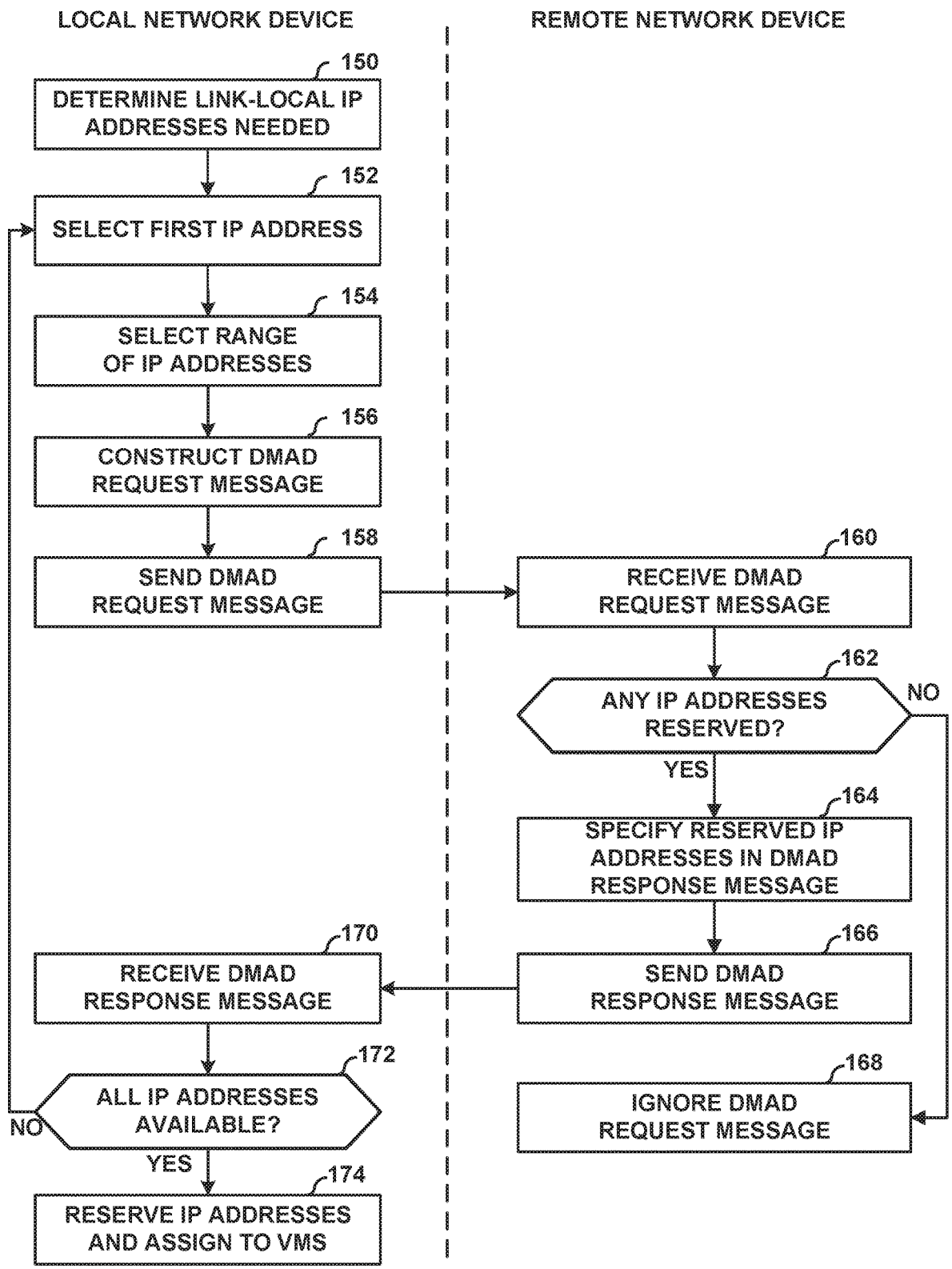
FIG. 6 is a flowchart illustrating an example method by which a network device may reserve a pool of IP addresses for a plurality of virtual machines (VMs).

FIG. 6 is a flowchart illustrating an example method by which a network device (e.g., local network device 12) may reserve a pool of IP addresses for a plurality of virtual machines (VMs), e.g., VMs 24. The method of FIG. 6 is explained with respect to local network device 12 and remote network device 16A of FIG. 1. However, it should be understood that other devices may perform these or similar techniques. For example, each of remote network devices 16 may perform the elements attributed to the remote network device of FIG. 6.

Initially, local network device 12 determines a pool of IP addresses that are needed (150). In particular, local network device 12 determines a number of IP addresses that are needed. In addition, local network device 12 determines a number of hardware addresses that are needed. For example, local network device 12 may determine a number of new VMs that are to be instantiated or that are likely to be instantiated in the near future.

Local network device 12 may then select a first IP address to be requested (152) and select a range of IP addresses (154). Local network device 12 may further select a first hardware address and a range of hardware addresses to be requested. For example, as discussed with respect to FIG. 1, local network device 12 maintains database 30 including entries for reserved hardware addresses and reserved IP addresses, e.g., hardware and IP addresses reserved by remote network devices 16. Local network device 12 may select the first IP address and the range of IP addresses to include a number of IP addresses that is equal to or greater than the number of needed IP addresses as determined above, and such that the range of IP addresses includes IP addresses that are not reserved as indicated in database 30.

In particular, local network device 12 generate a link-local address for an interface by appending an identifier of the interface to the well-known link-local prefix FE80::0, per Hinden et al., "IP Version 6 Addressing Architecture," Network Working Group, RFC4291, February 2006, available at tool:s.ietf.org/html/rfc4291, which is incorporated herein by reference. Links or nodes may have either EUI-64 identifiers or IEEE 802 48-bit MAC addresses. For a link or node with IEEE 802 48 bit MAC's, EUI64 defines a method to create a EUI-64 identifier from an IEEE 48 bit MAC identifier. The only change needed to transform an ELI-64 identifier to an interface identifier is by inverting the "u" bit (universal/local bit in IEEE EUI-64 terminology). To convert an IEEE 48-bit MAC identifier, e.g., "0015.2BE4.9B60" to an interface identifier, local network device 12 may do the following:

Step #1: Split the MAC address in the middle:
   0015.2B E4.9B60
Step #2: insert FF:FE in the middle:
   0015.2BFF.FEE4.9B60
Step #3: Change the format to use a colon delimiter:
   0015:2BFF:FEE4:9B60
Step #4: Convert the first eight bits to binary:
   00→00000000
Step #5: Flip the 7th bit:
   00000000→00000010
Step #6: Convert these first eight bits back into hex:
   00000010→02, which yields an EUI-64 address of 0215:2BFF:FEE4:9B60

In the randomly generated MAC address, the least significant two bytes are randomly generated number. so a sequence of MAC addresses also has a sequence of link local addresses. For example:
   MAC address→interface Identifier
   00:15.2B:E4.9B:60→0215:2BFF:FEE4:9B60
   00:15.2B:E4.9B:61→0215:2BFF:FEE4:9B61

Since there is one-to-one mapping between interface identifier and MAC address, so any duplicate detection mechanism for a pool of mac addresses can also check duplicate link local address for a pool of link local addresses. DMAD can be used detect duplicate hardware address for a group of MAC addresses and a group of link local address detection.

As per some RFCs, An interface identifier can be generated through some other means (e.g., at random), and there is no one-to-one mapping between interface identifier and MAC address. For those kind of interface identifiers, other techniques can be used to detect duplicate link local address or ND's DAD. Techniques for detecting duplicate MAC addresses may also be used, as discussed in Nayak et al., "DETECTING HARDWARE ADDRESS CONFLICTS IN COMPUTER NETWORKS," U.S. application Ser. No. 16/050,983, filed. Jul. 31, 2018, the entire contents of which are hereby incorporated by reference.

Local network device 12 then constructs a DMAD request message (156). The DMAD request message may conform to DMAD request message format 70 of FIG. 3. In general, local network device 12 constructs the DMAD request message to include data representing the first IP address and the range of IP addresses, e.g., values for target IPv6 address field 94 and range for target IP addresses field 88. Local network device 12 also specifies a first hardware address and range of hardware addresses, in some examples. Local network device 12 then sends the DMAD request message (158) to remote network devices 16. In particular, local network device 12 may send the DMAD request message to an IP address associated with a broadcast or multi cast group to which local network device 12 and remote network devices 16 are subscribed.

Remote network devices 16, such as remote network device 16A, may then receive the DMAD request message (160). Remote network device 16A then determines whether any IP addresses in the range of IP addresses specified in the DMAD request message (162). In the case that remote network device 16A does not have any of the specified IP addresses reserved ("NO" branch of 162), remote network device 16A may ignore the DMAD request message (168) (e.g., by not sending a response to the DMAD request message).

Assuming remote network device 16A has at least one IP address of the specified IP addresses reserved ("YES" branch of 162), remote network device 16A constructs a DMAD response message (e.g., conforming to DMAD response message format 70 of FIG. 3) specifying reserved IP addresses using values for reserved link local address field 86 and range for pool of reserved link local addresses field 88) (164). In some examples, remote network device 16A may further specify any reserved and/or released hardware addresses in the DMAD response message. Remote network device 16A then sends the DMAD response message to local network device 12 (166), e.g., in accordance with DMAD response message format 100 of FIG. 4. For example, remote network device 16A may send the DMAD response message to the broadcast or multicast group, such that the message reaches local network device 12 and each of the other remote network devices 16.

Local network device 12 may then receive the DMAD response message (170). Local network device 12 then determines whether all requested IP addresses are available (172). If there are some requested IP addresses that are not available ("NO" branch of 172), local network device 12 may reserve those IP addresses that are available and repeat the process from step 102 for those IP addresses that were not available, and iterate through this process until available IP addresses for all needed IP addresses have been determined ("YES" branch of 172). Local network device 12 may then reserve the IP addresses and assign the reserved IP addresses to VMs 24 (174).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including processing circuitry implementing one or more processors as described above, in conjunction with suitable software and/or firmware.

Various embodiments of the techniques have been described. These and other embodiments are within the scope of the following claims.

What is claimed is:

1. A method comprising:
   determining, by a network device, at least one Internet protocol (IP) address for assignment to a virtual machine (VM) executed by the network device;
   determining, by the network device, an IP address to request for the VM, the IP address conforming to IPv6;
   generating, by the network device, a message according to Duplicate Media Access Control Address Detection (DMAD) Protocol including a value in a hardware type field indicating that a hardware type for the message is DMAD over Ethernet, and further including data indicating that the message includes an IP address, the data further indicating the IP address; and
   sending, by the network device, the message according to DMAD to one or more network devices to determine whether the IP address is in use by the one or more network devices.

2. The method of claim 1, wherein the at least one IP address is a global IP address, and wherein the message comprises a DMAD request message including a sender hardware address field filled with a hardware address of a network interface of the network device, a sender IP address field set to a value of zero, a target hardware address set to a value of zero, an operation field having a value indicating that the DMAD request message includes data requesting a global IP address field to be reserved, and a target IP address field set to a value of the global IP address.

3. The method of claim 1, further comprising determining that the IP address is in use in response to receiving a DMAD response message specifying the IP address in a sender IP address field of the DMAD response message, wherein the message comprises a first message and the IP address comprises a first IP address, the method further comprising, in response to determining that the at least one IP address in the range is in use:
   determining, by the network device, a second IP address different than the first IP address;
   generating, by the network device, a second message according to DMAD including data indicating that the second message includes an IP address, the data further indicating the second IP address; and
   sending, by the network device, the second message according to DMAD to the one or more network devices to determine whether the second IP address is in use by the one or more network devices.

4. The method of claim 1, further comprising, in response to determining that the IP address is not in use by any of the one or more network devices, assigning the IP address to the VM, wherein determining that the IP address is not in use comprises receiving DMAD response messages from each of the one or more network devices, each of the DMAD response messages specifying sender IP addresses different than the IP address of the message.

5. The method of claim 1, wherein the at least one IP address comprises a plurality of a link-local IP addresses, and wherein the message comprises a DMAD request message having a target IP address field specifying the IP address and a range for target IP addresses field specifying a number of IP addresses in a range starting with the IP address, wherein sending the DMAD request message comprises sending the DMAD request message to determine whether any of the IP addresses in the range is in use by the one or more network devices.

6. The method of claim 5, further comprising generating the plurality of link-local IP addresses from a media access control (MAC) address of a network interface of the network device.

7. The method of claim 6, wherein the MAC address comprises an IEEE 48-bit MAC address, and wherein generating the plurality of link-local IP addresses comprises:
splitting the MAC address in the middle to form a middle MAC address;
inserting the value "FF:FE" in the middle of the middle MAC address;
converting the first eight bits of the middle MAC address to binary;
flipping the seventh bit of the first eight bits;
converting the first eight bits into hexadecimal to form an EUI-64 MAC address; and
appending the EUI-64 MAC address to "FE80::0".

8. A network device comprising:
a memory configured to store instructions for one or more virtual machines (VMs);
a network interface; and
a processor implemented in circuitry and configured to:
execute the instructions for the one or more VMs;
determine to assign at least one Internet protocol (IP) address to at least one VM of the one or more VMs;
determine an IP address to request for the at least one VM, the IP address conforming to IPv6;
generate a message according to Duplicate Media Access Control Address Detection (DMAD) Protocol including a value in a hardware type field indicating that a hardware type for the message is DMAD over Ethernet, and further including data indicating that the message includes an IP address, the data further indicating the IP address; and
send the message according to DMAD via the network interface to one or more network devices to determine whether the IP address is in use by the one or more network devices.

9. The network device of claim 8, wherein the at least one IP address is a global IP address, and wherein the message comprises a DMAD request message including a sender hardware address field filled with a hardware address of the network interface, a sender IP address field set to a value of zero, a target hardware address set to a value of zero, an operation field having a value indicating that the DMAD request message includes data requesting a global IP address field to be reserved, and a target IP address field set to a value of the global IP address.

10. The network device of claim 8, wherein the processor is further configured to determine that the IP address is in use in response to receiving a DMAD response message specifying the IP address in a sender IP address field of the DMAD response message, wherein the message comprises a first message and the IP address comprises a first IP address, and wherein the processor is further configured to, in response to determining that the at least one IP address in the range is in use:
determine a second IP address different than the first IP address;
generate a second message according to DMAD including data indicating that the second message includes an IP address, the data further indicating the second IP address; and
send the second message according to DMAD to the one or more network devices to determine whether the second IP address is in use by the one or more network devices.

11. The network device of claim 8, wherein the processor is further configured to, in response to determining that the IP address is not in use by any of the one or more network devices, assign the IP address to the at least one VM, wherein to determine that the IP addresses is not in use, the processor is configured to receive DMAD response messages from each of the one or more network devices, each of the DMAD response messages specifying sender IP addresses different than the IP address of the message.

12. The network device of claim 8, wherein the at least one IP address comprises a plurality of a link-local IP addresses, and wherein the message comprises a DMAD request message having a target IP address field specifying the IP address and a range for target IP addresses field specifying a number of IP addresses in a range starting with the IP address, wherein the process is configured to send the DMAD request message to determine whether any of the IP addresses in the range is in use by the one or more network devices.

13. The network device of claim 12, wherein the processor is configured to generate the plurality of link-local IP addresses from a media access control (MAC) address of the network interface.

14. The network device of claim 13, wherein the MAC address comprises an IEEE 48-bit MAC address, and wherein to generate the plurality of link-local IP addresses, the processor is configured to:
split the MAC address in the middle to form a middle MAC address;
insert the value "FF:FE" in the middle of the middle MAC address;
convert the first eight bits of the middle MAC address to binary;
flip the seventh bit of the first eight bits;
convert the first eight bits into hexadecimal to form an EUI-64 MAC address; and
append the EUI-64 MAC address to "FE80::0".

15. A computer-readable storage medium having stored thereon instructions that, when executed, cause a processor of a network device to:
determine to assign at least one Internet protocol (IP) address to a virtual machine (VM) executed by the network device;
determine an IP address to request for the VM, the IP address conforming to IPv6;
generate a message according to Duplicate Media Access Control Address Detection (DMAD) Protocol including a value in a hardware type field indicating that a hardware type for the message is DMAD over Ethernet, and further including data indicating that the message includes an IP address, the data further indicating the IP address; and
send the message according to DMAD to one or more network devices to determine whether the IP address is in use by the one or more network devices.

16. The computer-readable storage medium of claim 15, wherein the at least one IP address is a global IP address, and wherein the message comprises a DMAD request message including a sender hardware address field filled with a hardware address of a network interface of the network device, a sender IP address field set to a value of zero, a target hardware address set to a value of zero, an operation field having a value indicating that the DMAD request message includes data requesting a global IP address field to be reserved, and a target IP address field set to a value of the global IP address.

17. The computer-readable storage medium of claim 15, further comprising instructions that cause the processor to determine that the IP address is in use in response to receiving a DMAD response message specifying the IP address in a sender IP address field of the DMAD response message, wherein the message comprises a first message and the IP address comprises a first IP address, further comprising instructions that cause the processor to, in response to determining that the at least one IP address in the range is in use:
  determine a second IP address different than the first IP address;
  generate a second message according to DMAD including data indicating that the second message includes an IP address, the data further indicating the second IP address; and
  send the second message according to DMAD to the one or more network devices to determine whether the second IP address is in use by the one or more network devices.

18. The computer-readable storage medium of claim 15, further comprising instructions that cause the processor to, in response to determining that the IP address is not in use by any of the one or more network devices, assign the IP address to the VM, wherein the instructions that cause the processor to determine that the IP address is not in use comprises instructions that cause the processor to receive DMAD response messages from each of the one or more network devices, each of the DMAD response messages specifying sender IP addresses different than the IP address of the message.

19. The computer-readable storage medium of claim 15, wherein the at least one IP address comprises a plurality of a link-local IP addresses, and wherein the message comprises a DMAD request message having a target IP address field specifying the IP address and a range for target IP addresses field specifying a number of IP addresses in a range starting with the IP address, wherein the instructions that cause the processor to send the DMAD request message comprise instructions that cause the processor to send the DMAD request message to determine whether any of the IP addresses in the range is in use by the one or more network devices.

20. The computer-readable storage medium of claim 19, further comprising instructions that cause the processor to generate the plurality of link-local IP addresses from an IEEE 48-bit media access control (MAC) address of a network interface of the network device, and wherein the instructions that cause the processor to generate the plurality of link-local IP addresses comprise instructions that cause the processor to:
  split the MAC address in the middle to form a middle MAC address;
  insert the value "FF:FE" in the middle of the middle MAC address;
  convert the first eight bits of the middle MAC address to binary;
  flip the seventh bit of the first eight bits;
  convert the first eight bits into hexadecimal to form an EUI-64 MAC address; and
  append the EUI-64 MAC address to "FE80::0".

* * * * *